(12) United States Patent
Nielsen

(10) Patent No.: US 9,347,429 B2
(45) Date of Patent: May 24, 2016

(54) REACTIVE POWER CONTROL DURING LOSS OF COMMUNICATION

(71) Applicant: Kaj Skov Nielsen, Issaquah, WA (US)

(72) Inventor: Kaj Skov Nielsen, Issaquah, WA (US)

(73) Assignee: SIEMENS AKTIENGESELLSCHAFT, München (DE)

(*) Notice: Subject to any disclaimer, the term of this patent is extended or adjusted under 35 U.S.C. 154(b) by 369 days.

(21) Appl. No.: 13/922,293

(22) Filed: Jun. 20, 2013

(65) Prior Publication Data

US 2014/0375052 A1 Dec. 25, 2014

(51) Int. Cl.
- *F03D 9/00* (2006.01)
- *F03D 7/00* (2006.01)
- *F03D 7/02* (2006.01)
- *H02J 3/38* (2006.01)

(52) U.S. Cl.
CPC ................ *F03D 7/00* (2013.01); *F03D 7/0284* (2013.01); *F03D 9/003* (2013.01); *H02J 3/386* (2013.01)

(58) Field of Classification Search
None
See application file for complete search history.

(56) References Cited

U.S. PATENT DOCUMENTS

| | | | |
|---|---|---|---|
| 5,083,039 A | 1/1992 | Erdman | |
| 2010/0025994 A1* | 2/2010 | Cardinal | F03D 7/0284 290/44 |
| 2012/0203384 A1* | 8/2012 | Arlaban Gabeiras | H02J 3/06 700/286 |
| 2013/0136597 A1* | 5/2013 | Hansen | F03D 7/047 416/31 |

* cited by examiner

*Primary Examiner* — Sean Shechtman
*Assistant Examiner* — Steven Garland

(57) ABSTRACT

A method of operating a wind turbine of a wind park is provided. In a first step a status of a communication connection to a wind park controller is checked. When the status of the communication connection is positive, the wind turbine will be operated in accordance with at least one reference set point received from the wind park controller. When the status of the communication connection is negative, a substitute reference set point will be determined as a function of a present power output of the wind turbine and the wind turbine will be operated in accordance with the substitute reference set point.

11 Claims, 2 Drawing Sheets

REACTIVE POWER CONTROL DURING LOSS OF COMMUNICATION

FIELD OF INVENTION

A method of operating a wind turbine and a wind turbine operating according to the method is provided.

BACKGROUND OF THE INVENTION

Over the last decade the fraction of energy added to utility grids by wind parks has increased significantly. Therefore, there is also an increased need for controlling wind parks delivering energy to utility grids with respect to a number of parameters which are important for the utility grid to work faultlessly. In addition to the voltage and the frequency of the power delivered to the utility grid, it may also be important to provide, on request of the utility system operator, a certain reactive power or a certain power factor. The reactive power is the power needed by inductive and capacitive users to build up their magnetic and electric fields, respectively. With an alternating current such magnetic and electric fields will be built up and down periodically, which leads to a reactive power flow from and to the electric generators.

The power factor is the ratio of the active power over the apparent power. The apparent power is the square root of the square of the active power plus the square of the reactive. A power factor of one means that no reactive power is present and the supplied power contains only active power and corresponds to a phase difference between the voltage and the current of zero degrees, since the power factor is given by the cosine of the phase angle between the voltage and the current. On the other hand, a phase difference of 90°, i.e. a power factor of zero, means that only reactive power is present.

Variations in the demand for reactive power in the utility grid need to be compensated through reactive power provided by the power generators. As long as the power delivered to the utility grids by wind parks was only a minor fraction of the total power delivered to the grids, there was no need for the wind parks to react to the reactive power demands or power factor demands of the grid. However, with the always increasing fraction of power fed into utility grids by wind parks, the dynamic power factor control or a dynamic reactive power control of wind parks becomes more and more important.

Dynamic power factor control of wind parks is often implemented with capacitor banks mounted in individual wind turbines. A varying number of capacitors are selectively connected to the grid to provide such reactive power as is required to meet the specified power factor. Dynamic power factor control may also be implemented by an arrangement where the individual wind turbines are equipped with a power electronic converter that converts part or whole of the electricity supplied by the wind turbine. The power electronic converter of the individual wind turbine is programmed to control the power factor of the electricity supplied by the wind turbine. E.g., if the wind turbine is equipped with a transformer for transforming the voltage output of the converter to a medium voltage on a bus connecting the wind turbines of the wind park, the reactive power output from the wind turbine can be controlled by setting a voltage set point of the converter connected to the primary side of the transformer.

For these types of power factor control system the desired power factor is typically provided as a signal from a central SCADA (Supervise Control and Data Acquisition) system of the wind park. This SCADA system is also referred to as the wind park controller. The utility system operator dispatches a request to the wind park for a certain power factor and the central SCADA system sends set points in accordance with the power factor request to the individual wind turbines to compensate for the power factor contribution of the wind park electrical infrastructure. The wind park controller is connected to the individual wind turbines via communication lines. These communication lines may have significant lengths because the wind park may be distributed over a very large geographical area.

An arrangement for dynamic power control is, e.g., described in U.S. Pat. No. 5,083,039, which describes a wind turbine with dynamic power factor control and sending control signals to power electronic converters of wind turbines. The power electronic converters are then locally controlled such that the power factor delivered by the local wind turbine is shifted through changing the ratio of active and reactive current supplied to the grid by the converter module of the power electronic converter.

In a wind park the power output of each wind turbine constantly changes due to local variations in wind speed, wind direction etc. Since the amount of reactive power provided by a single wind turbine of a wind park changes with its active power output but the total amount of reactive power requested from the wind park by the utility system operator usually remains constant over relatively longer periods of time, the reference set points of all wind turbines need to be adjusted frequently by the wind park controller.

Wind parks are often located in areas with unreliable communication infrastructure. Currently, when communication between the wind park controller and a specific wind turbine fails, a wind turbine will either preserve its last valid set point or it may fall back to a predefined set point after a predetermined time-out on the communication with the wind park controller. However, if the power output of the wind turbine changes due to e.g. variations in wind speed while its voltage set point is kept constant, so will its reactive power. Thus, a wind park may provide an amount of reactive power which largely deviates from the amount requested by the utility grid operator when there is a loss of communication within the wind park. Such unrequested amounts of reactive power may affect operation of the utility grid. Similarly, if the wind turbine is controlled in reactive power control mode and the reactive power set point is maintained during loss of communication, significant changes in the voltage level at the point of interconnection will result when power output changes. Again, this may affect utility grid operation. Furthermore, when the communication is restored, a large reactive step or reactive ramp event may occur in the general control of the wind park due to the power generation changes that have occurred while the communication was lost.

Thus, it is an object to provide an improved method of operating a wind turbine.

SUMMARY OF THE INVENTION

Thus, a first aspect provides a method of operating a wind turbine of a wind park. The method includes the steps of:
- checking a status of a communication connection to a wind park controller;
- when the status of the communication connection is positive, i.e. when the communication connection is functional, operating the wind turbine in accordance with at least one reference set point received from the wind park controller;
- when the status of the communication connection is negative, i.e. when the communication connection has failed, determining a substitute reference set point as a function of a present power output of the wind turbine and operating the wind turbine in accordance with the substitute reference set point.

Herein the term "reference set point" usually refers to a voltage reference set point which designates an output voltage of the wind turbine that the wind turbine is requested to output. However, a "reference set point" may also be expressed as a power factor or a reactive power to be provided by the wind turbine.

An advantage of the wind turbine operated according to the method is that it may provide a reasonable amount of reactive power even when the power production level of the wind turbine changes while the communication connection to the wind park controller is down. For example, it has been found that if the communication fails at a production level of 40 kW and is restored after the power production level has risen to 1900 kW, the prior art operating method would result in almost 4 V error at the output of the wind turbine. However, if the wind turbine changes its reference set point independently from the wind park controller, the voltage error can be reduced to just about 1 V. The resulting impact on the grid will depend on the actual droop settings. With a typical droop setting of 4% for wind power plants situated in the United Kingdom the resulting reactive power step for a 4 V error would represent about 25% of the reactive capability of the wind power plant. The method reduces this step to roughly 5% of the reactive capability.

Preferably the substitute reference set point is determined based on past reference set points for the wind turbine. In such embodiments each wind turbine collects past reference set points received from the wind park controller and thus builds a database that may be evaluated for the most likely reference set point that the wind park controller would transmit for a given power output level. This has an advantage in that the wind turbine may adapt to specific conditions of the geographical circumstances, of the wind park geometry and the local utility grid connection.

In such embodiments of the inventive method the substitute reference set point may be determined based on a line of best fit of the past reference set points. A variety of known methods for establishing a line of best fit may be used.

Alternatively the substitute reference set point may be determined based on a predetermined function. This may be advantageous in situations where a predictable behaviour of the wind turbine during loss of communication is preferred.

For example, the predetermined function may return a first voltage reference set point for a first present power output value and a second voltage reference set point greater than the first voltage reference set point for a second present power output value greater than the first present power output value. Accordingly, the output voltage of the wind turbine will increase with an increasing power output.

In particular, the predetermined function may constantly ascend from the first present power output value to the second present power output value, e.g. the predetermined function may be linear between the first present power output value and the second present power output value.

The predetermined function may be a function of the present power output of the wind turbine and of a last one of the at least one reference set point received from the wind park controller. In this way the wind turbine is controlled taking the last reference set point received from the wind park controller into consideration. For example, a prediction of further reference set points that would have been received after the last reference set point may be carried out based on the last reference set point and optionally other past reference set points.

In specific embodiments the predetermined function may be a sum of a function of the present power output of the wind turbine and an offset that is a function of the last one of the reference set points received from the wind park controller. The offset may be a difference between the last reference set point and a constant value.

Alternatively the predetermined function may be an interpolation between the last one of the at least one reference set point received from the wind park controller and a predefined substitute reference set point assigned to a threshold present power output of the wind turbine if the present power output is lower than the threshold present power output of the wind turbine. This takes into account that historic reference set point data shows that collected reference set points vary much more for low power outputs while reference set points for higher power outputs are to be found in a more confined area of a diagram showing collected reference set points as a function of output power. In such cases it may be more reasonable to determine reference set points based on the last received reference set point and the threshold present power output of the wind turbine associated with a lower end of the confined area mentioned above. This will become more apparent when referring to FIG. 4.

In addition the predetermined function may be replaced by a function independent of the last one of the at least one reference set point received from the wind park controller once the present power output of the wind turbine has exceeded the threshold present power output of the wind turbine. This means that a special control for power outputs below the threshold present power output will only be carried out as long as the present power output constantly remains below the threshold present power output but will be replaced with a normal control once the present power output has exceeded the threshold present power output. The idea is that the normal control is the most likely to be appropriate after the output power levels have changed significantly outdating the last received reference set point.

A second aspect provides a wind turbine comprising a wind turbine controller for operating the wind turbine and adapted to carry out the method.

BRIEF DESCRIPTION OF THE DRAWINGS

A description of the preferred embodiments and further illustrated referring to figures follows. Like reference numerals designate the same or similar items throughout the figures.

DETAILED DESCRIPTION OF THE DRAWINGS

Figure 1:
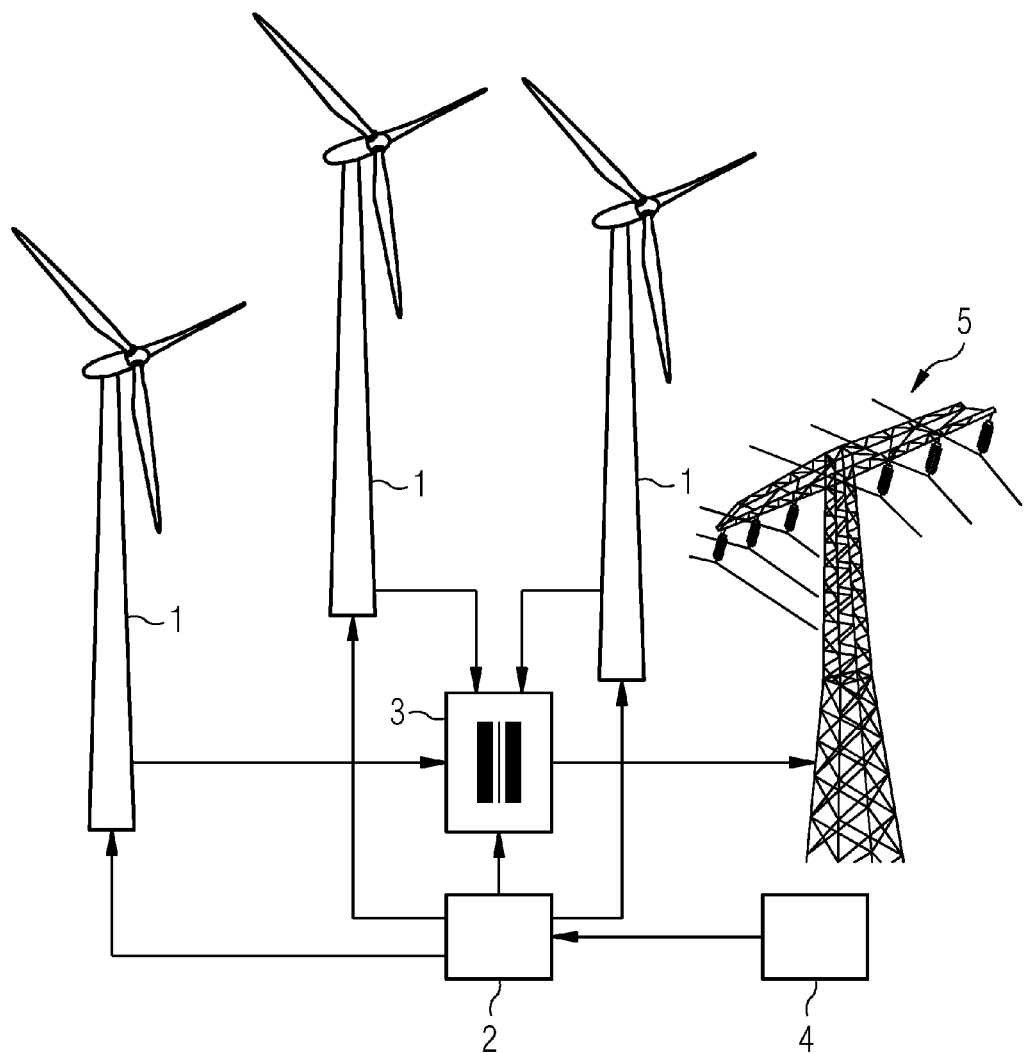
FIG. 1 shows a wind park with wind turbines operable according to the method of the invention.

FIG. 1 shows a wind park including a plurality of wind turbines 1 operable according to the method. The wind turbines 1 of the exemplary wind park are connected to a utility power grid 5 by means of a park transformer 3. An output side of the park transformer 3 forms the "point of interconnection" to the utility power grid 5. The park transformer 3 is used for converting a voltage on a wind park power bus connecting the wind turbines 1 to the voltage of the utility power grid 5. The park transformer 3 may be a multi-tap transformer. A park controller 2 receives requests from an operator 4 of the utility power grid 5 according to which the power generated by the wind park is to be provided to the utility power grid 5 in order to ensure faultless operation of the utility power grid 5. The park controller 2 is connected to the wind turbines 1 and the park transformer 3 and sends control commands in the form of reference set points to the wind turbines 1 and the park transformer 3. The wind turbines 1 may output reactive power. The amount of reactive power provided by a wind turbine 1 may be controlled by setting an output voltage of the wind turbine 1. If communication fails between the park controller 2 and one or more wind turbines 1, valid reference set points may not be transmitted to the respective wind turbines 1. In such cases a wind turbine controller (not shown) forming part of each wind turbine 1 may determine new reference set points (substitute reference set points) for the wind turbine 1 in order to accommodate for changes in the present output power of the wind turbine 1 until communication with the wind park controller 2 is re-established.

Figure 2:
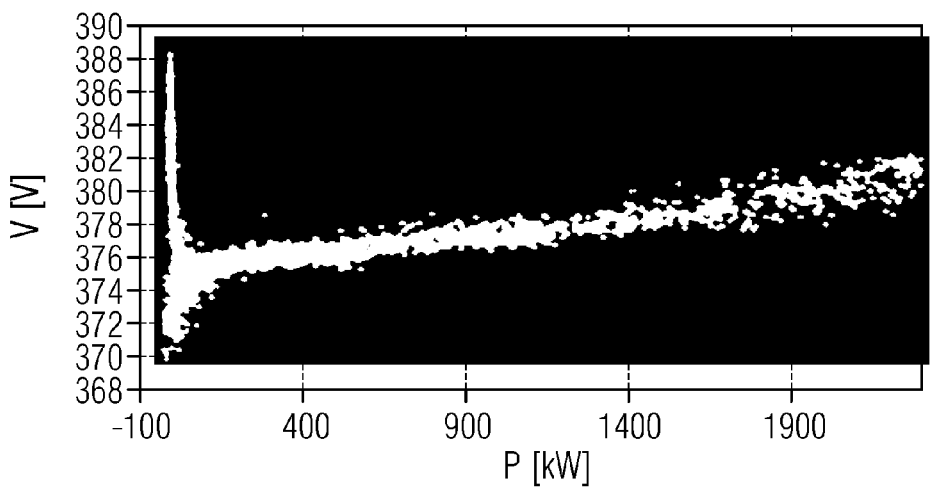
FIG. 2 shows typical collected voltage reference set point data for a wind turbine received from a wind park controller.

FIG. 2 shows typical collected voltage reference set point data for a wind turbine received from a wind park controller. The diagram shows a multitude of voltage reference set points that were received from the wind park controller 2. Each voltage reference set point assigns an output voltage V to be generated by the wind turbine to the present output power P generated by the wind turbine at the time the respective voltage reference set point was received. As can be seen from the diagram, the voltage reference set points are not randomly distributed but are strongly correlated. The voltage reference set points obviously are governed by underlying principles. Thus, reasonable reference set points may be selected by the wind turbine 1 independently from the wind park controller 2 in accordance with changing output powers P at times when the communication connection to the wind park controller 2 fails. For example, the wind turbine 1 may be provided with a predefined function for determining suitable substitute reference set points in accordance with the present output power of the wind turbine 1. Furthermore, the wind turbine 1 may be adapted to collect reference set point data and to determine substitute reference set points based on the collected data. For such purposes it may be useful to evaluate the collected data in the wind turbine 1 e.g. by fitting a line of best fit to the collected data and determining the substitute reference set points referring to the line of best fit. Other methods may be used, e.g. a collected reference set point resembling the present operating conditions most closely may be selected as a substitute reference set point.

Figure 3:
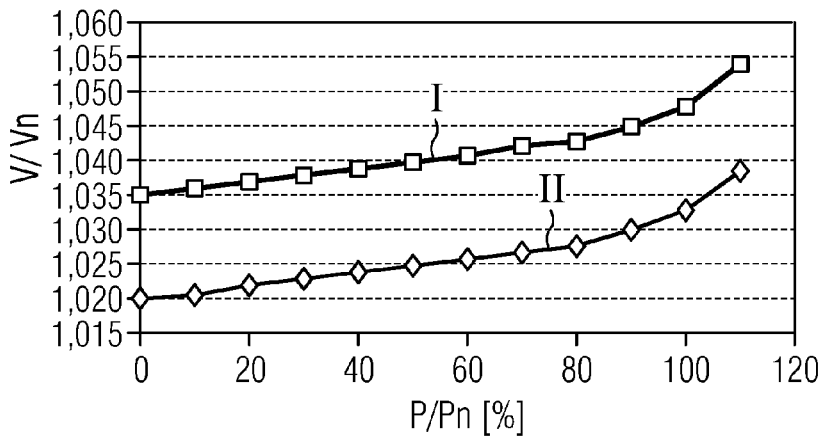
FIG. 3 shows predetermined functions for determining reference set points in accordance with an embodiment of the invention.

FIG. 3 shows predetermined functions for determining reference set points in accordance with an embodiment. In the diagram of FIG. 3 both the present output power of the wind turbine and the substitute voltage reference set point are normalised by dividing by the nominal output power $P_n$ and the nominal output voltage $V_n$, respectively.

In the embodiment, illustrated by FIG. 3 the substitute reference set points are determined based on a predetermined function rather than on collected reference set point data. More specifically, the predefined function is a function of the present output power as well as of the last reference set point received from the wind park controller. The diagram shows two curves I and II each assigned to a corresponding last received reference set point. For example, if the last received reference set point was relatively high, the substitute reference set points may be determined according to curve I. If, on the other hand, the last received reference set point was relatively low, the substitute reference set points may also be determined in accordance with the lower curve II. As can be seen from inspection of FIG. 3, curve II of the shown example may be generated from curve I by shifting curve I by a certain offset. In particular embodiments, such an offset may be determined as a function of the last received reference set points thus shifting a predetermined function for determining substitute reference set points which is only a function of the present output power but not of the last received reference set point.

Figure 4:
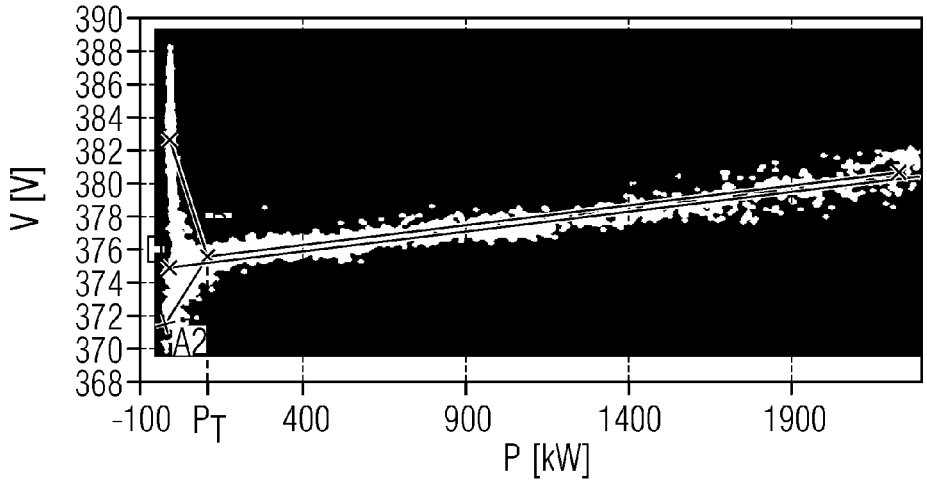
FIG. 4 illustrates an alternative embodiment of the predefined function.

FIG. 4 illustrates an alternative embodiment of the predefined function. FIG. 4 shows the same set of collected reference set point data as FIG. 2. As can be seen from the collected data, the voltage reference set points vary widely for very low output powers P. The reference set point will be determined for reasons that are unknown to the wind turbine. Thus, it may be reasonable to let substitute reference set points depend strongly on the last received reference set point if this last received reference set point was a reference set point for a low output power (lower than a threshold output power $P_T$) and if the present output power remains low (i.e. below the threshold output power). On the other hand, once the present output power of the wind turbine has risen above the threshold output power, the substitute reference set points should follow the strong correlation found for greater output powers and thus should depend less on the last received reference set point. In one exemplary embodiment the substitute reference set points may be determined by interpolation of the last received reference set point and a substitute reference set point associated with the threshold output power (point B in FIG. 4). For all output powers greater than $P_T$ the substitute reference set points will be determined referring to the line reaching from point B to point C in FIG. 4. For example, the wind turbine may be operating using a reference set point A1 when communication with the wind park controller fails. Once the output power of the wind turbine changes, new (substitute) reference set points need to be determined These substitute reference set points will be determined using the line connecting reference set point A1 with point B. Alternatively, if the last received reference set point was A2, the substitute reference set points would be determined using the line from A2 to B. After the present output power has risen above $P_T$, future reference set points for output powers lower than $P_T$ will be determined referring to the line D-B which is an extrapolation of the line B-C.

Even though the invention has been described referring to illustrative embodiments, the invention is not limited to the described exemplary embodiments. A person skilled in the art will be able to derive variations without leaving the scope of the invention as defined by the appending claims.

I claim:

1. A method of operating a wind turbine of a wind park, the method comprising:
    checking a status of a communication connection to a wind park controller, wherein:
        when the status of the communication connection is positive, operating the wind turbine in accordance with a reference set point received from the wind park controller,
        when the status of the communication connection is negative, determining a substitute reference set point as a function of a present power output of the wind turbine and operating the wind turbine in accordance with the substitute reference set point;
    wherein the substitute reference set point is determined based on past reference set points for the wind turbine; and
    wherein the substitute reference set point is determined based on a line of best fit of the past reference set points.

2. A wind turbine, comprising:
a wind turbine controller for operating the wind turbine,
wherein the wind turbine controller is adapted to carry out the method of claim 1.

3. A method of operating a wind turbine of a wind park, the method comprising:
checking a status of a communication connection to a wind park controller, wherein:
when the status of the communication connection is positive, operating the wind turbine in accordance with a reference set point received from the wind park controller,
when the status of the communication connection is negative, determining a substitute reference set point as a function of a present power output of the wind turbine and operating the wind turbine in accordance with the substitute reference set point;
wherein the substitute reference set point is determined based on a predetermined function; and
wherein the predetermined function returns a first voltage reference set point for a first present power output value and a second voltage reference set point greater than the first voltage reference set point for a second present power output value greater than the first present power output value.

4. The method of claim 3, wherein the predetermined function constantly ascends from the first present power output value to the second present power output value.

5. The method of claim 4, wherein the predetermined function is linear between the first present power output value and the second present power output value.

6. A wind turbine, comprising:
a wind turbine controller for operating the wind turbine,
wherein the wind turbine controller is adapted to carry out the method of claim 3.

7. A method of operating a wind turbine of a wind park, the method comprising:
checking a status of a communication connection to a wind park controller, wherein:
when the status of the communication connection is positive, operating the wind turbine in accordance with a reference set point received from the wind park controller,
when the status of the communication connection is negative, determining a substitute reference set point as a function of a present power output of the wind turbine and operating the wind turbine in accordance with the substitute reference set point;
wherein the substitute reference set point is determined based on a predetermined function; and
wherein the predetermined function is a function of the present power output of the wind turbine and of a last one of the at least one reference set point received from the wind park controller.

8. The method of claim 7, wherein the predetermined function is a sum of a function of the present power output of the wind turbine and an offset that is a function of the last one of the reference set points received from the wind park controller.

9. The method of claim 7, wherein the predetermined function is an interpolation between the last one of the at least one reference set point received from the wind park controller and a predefined substitute reference set point assigned to a threshold present power output of the wind turbine when the present power output is lower than the threshold present power output of the wind turbine.

10. The method of claim 9, wherein the predetermined function is replaced by a function independent of the last one of the reference set point received from the wind park controller once the present power output of the wind turbine has exceeded the threshold present power output of the wind turbine.

11. A wind turbine, comprising:
a wind turbine controller for operating the wind turbine,
wherein the wind turbine controller is adapted to carry out the method of claim 7.

* * * * *